(12) United States Patent
Kim et al.

(10) Patent No.: US 11,294,982 B2
(45) Date of Patent: Apr. 5, 2022

(54) METHOD, APPARATUS AND COMPUTER PROGRAM FOR DISPLAYING SEARCH INFORMATION

(71) Applicant: ODD CONCEPTS INC., Seoul (KR)

(72) Inventors: Jung Tae Kim, Seoul (KR); Jae Yun Yeo, Seoul (KR)

(73) Assignee: Odd Concepts Inc., Seoul (KR)

( * ) Notice: Subject to any disclaimer, the term of this patent is extended or adjusted under 35 U.S.C. 154(b) by 251 days.

(21) Appl. No.: 15/577,458

(22) PCT Filed: Jun. 1, 2016

(86) PCT No.: PCT/KR2016/005785
§ 371 (c)(1),
(2) Date: Nov. 28, 2017

(87) PCT Pub. No.: WO2016/195368
PCT Pub. Date: Dec. 8, 2016

(65) Prior Publication Data
US 2018/0150566 A1 May 31, 2018

(30) Foreign Application Priority Data
Jun. 5, 2015 (KR) .......................... 10-2015-0080152

(51) Int. Cl.
G06F 16/951 (2019.01)
G06F 16/955 (2019.01)
G06F 16/00 (2019.01)
(52) U.S. Cl.
CPC ............ *G06F 16/955* (2019.01); *G06F 16/00* (2019.01); *G06F 16/951* (2019.01)

(58) Field of Classification Search
None
See application file for complete search history.

(56) References Cited

U.S. PATENT DOCUMENTS

2003/0055827 A1\* 3/2003 Keohane ............... G06F 16/951
2012/0110064 A1\* 5/2012 Chen ....................... H04W 4/21
709/203

(Continued)

FOREIGN PATENT DOCUMENTS

CN 103797481 A 5/2014
CN 104504083 A 4/2015

(Continued)

OTHER PUBLICATIONS

Lefebvre, Rob : iOS 7 Basics—How To Use Spotlight To Search Your iPhone [iOS Tips], Cult of Mac, Jan. 17, 2014, https://www.cultofmac.com/262912/ios-7-basics-use-spotlight-search-iphone-ios-tips/.\*

(Continued)

*Primary Examiner* — Mark D Featherstone
*Assistant Examiner* — Samuel C Sharpless, III
(74) *Attorney, Agent, or Firm* — Adsero IP (57) ABSTRACT

The present invention relates to a method for an electronic device displaying search information. The method comprises the steps of: transmitting a query with respect to a displayed page; and displaying search information that matches with content included in the page, wherein the step of transmitting a query is characterised by transmitting the query including one or more of a record log of a web browser executing the page, data extracted from the record log, data that is extracted from the page and that can be uploaded, and a screenshot of the page.

9 Claims, 9 Drawing Sheets

(56) References Cited

U.S. PATENT DOCUMENTS

| | | | |
|---|---|---|---|
| 2013/0275411 A1* | 10/2013 | Kim | G06F 16/434 |
| | | | 707/722 |
| 2013/0332317 A1 | 12/2013 | Boncyk et al. | |
| 2014/0380214 A1* | 12/2014 | Huang | G06F 3/0486 |
| | | | 715/769 |
| 2015/0058318 A1* | 2/2015 | Blackwell | G06F 3/04817 |
| | | | 707/722 |
| 2015/0161086 A1* | 6/2015 | Wu | G06F 3/04842 |
| | | | 715/234 |
| 2015/0286622 A1* | 10/2015 | Majumdar | G06F 16/986 |
| | | | 715/230 |

FOREIGN PATENT DOCUMENTS

| | | |
|---|---|---|
| KR | 10-0964090 B1 | 6/2010 |
| KR | 10-2011-0111666 A | 10/2011 |
| KR | 10-2014-0108499 A | 9/2014 |
| KR | 10-2014-0132417 A | 11/2014 |

OTHER PUBLICATIONS

International Search Report for PCT/KR2016/005785 filed on Jun. 1, 2016.

Office action for CN Application 201680032571.0, dated Sep. 2, 2020, 25 pages including English translation of Office action.

* cited by examiner

METHOD, APPARATUS AND COMPUTER PROGRAM FOR DISPLAYING SEARCH INFORMATION

CROSS REFERENCE TO RELATED APPLICATIONS PARAGRAPH

This application is a U.S. National Stage of PCT/KR2016/005785, filed Jun. 1, 2016, which claims the priority benefit of Korean Patent Application No. 10-2015-0080152, filed on Jun. 5, 2015 in the Korean Intellectual Property Office, the disclosures of which are incorporated herein by reference.

TECHNICAL FIELD

The present invention relates to a method and an apparatus for offering search information in an electronic device. More particularly, the present invention relates to a method and an apparatus for requesting a search for relevant products and/or services and acquiring matching shopping information without inputting any search term while an electronic device is displaying content.

BACKGROUND ART

In the recent growing wired/wireless Internet environment, online promotions, business transactions and trading are becoming more popular. Once a consumer discovers a product that the consumer likes while searching for magazines, blogs, or YouTube videos on an Internet-connected desktop or mobile terminal, the consumer finds out the product name and purchases the product. The brand of a bag carried by a famous actress to the airport or the name of a baby product shown on a TV show ranks highly on a list of search terms entered into a portal site. However, a user needs to individually open a webpage to search for and find a product name and a store, sometimes having difficulty in finding a product without knowing a product name.

Sellers spend a lot of money not only on commercials but on media sponsorship and the collection of online consumer reviews in order to promote products, since word-of-mouth online advertising functions as an important factor for the sale of products. However, it is frequently not allowed to release product information including a product name and a store despite paying promotional expenses because it is impossible to obtain prior approval for the display of a product name from individual media viewers, thus bringing about an issue affecting indirect advertising.

There is a need from both a user and a seller for shopping information on an online product image that is offered in an intuitive User Interface (UI) environment.

DETAILED DESCRIPTION OF THE INVENTION

Technical Problem

The present invention has been made in order to solve the above-mentioned problems. In particular, an aspect of the present invention is to provide a method and an apparatus for efficiently providing shopping information, such as price information, online store site information, advertisement information, coupon information, and promotion information, relating to content included in an arbitrary page, which is being displayed by an electronic device.

Further, an aspect of the present invention is to provide a method and an apparatus for providing, using various intuitive options, a user interface for requesting a shopping information search for content displayed on an electronic device.

Technical Solution

A method for displaying search information by an electronic device according to an embodiment of the present invention includes: transmitting a query about a displayed page; and displaying search information that matches content included in the page, wherein the transmitting of the query includes transmitting the query including a history log of a web browser displaying a webpage or data extracted from the history log when the page is a webpage, or includes transmitting the query including a screenshot or uploadable data when the page is not a webpage.

A method for displaying search information by an electronic device according to an embodiment of the present invention includes: displaying an arbitrary page; displaying a search icon on the page when it is possible to retrieve content included in the page; and displaying search information that matches the content when an input to select the icon is received.

A method for displaying search information by an electronic device according to another embodiment of the present invention includes: receiving an input to select a search icon included in at least one of a notification list and a share menu list while displaying an arbitrary page; and displaying search information that matches content included in the page.

An application stored in a medium that performs processing to display search information in an electronic device according to an embodiment of the present invention includes: a function of running in the background, instead of terminating, when a product search function of the application is activated; a function of transmitting a query about an arbitrary page displayed by another application to a shopping information provision server; and a function of displaying search information that matches the page, wherein the function of transmitting the query is implemented to transmit the query including a history log of a web browser running a webpage or data extracted from the history log when the page is a webpage, or to transmit the query including a screenshot or uploadable data when the page is not a webpage.

An electronic device for displaying search information according to an embodiment of the present invention includes: a display configured to display an arbitrary page; and a controller configured to transmit a query about the page to a shopping information provision server and to control display of search information that matches the page, wherein the controller transmits the query including a history log of a web browser running a webpage or data extracted from the history log when the page is a webpage, or transmits the query including a screenshot or uploadable image data when the page is not a webpage.

A method for providing search information by a server to a client according to an embodiment of the present invention includes: generating a database of a plurality of products and extracting feature information on an image included in the database; receiving a query from the client; determining a product or a service that matches a query image acquired from the query by retrieving the feature information on the image in the database; and offering search information on the matching product or service to the client, wherein the determining of the matching product or service includes: indexing the feature information on the image in the database by classifying the feature information into one or more categories according to preset criteria; acquiring an image from the query and extracting feature information on the query image; and determining whether the feature information on the query image matches the feature information on the image in the database using indexing information on the image in the database.

Advantageous Effects

According to the present invention, a user can retrieve relevant products and/or services and can be provided with search information without visiting a separate search page or inputting text while browsing through arbitrary content on an electronic device. Therefore, convenience in shopping may be improved for purchasers, while advertising effects may be increased for sellers.

MODE FOR CARRYING OUT THE INVENTION

It will be obvious that the present invention is not limited to the details of the embodiments described below and may be variously modified without departing from the technical gist of the present invention. In describing the embodiments, descriptions of technologies which are well-known in the technical field to which the present invention pertains and are not directly related to the technical gist of the present invention may be omitted.

Like reference numerals refer to like elements throughout the accompanying drawings. Further, in the drawings, some elements may be exaggerated, omitted, or schematically illustrated, which serves to clarify the gist of the present invention by omitting unnecessary descriptions not related to the gist of the present invention. Hereinafter, embodiments of the present invention will be described in detail with reference to the accompanying drawings.

Figure 1:
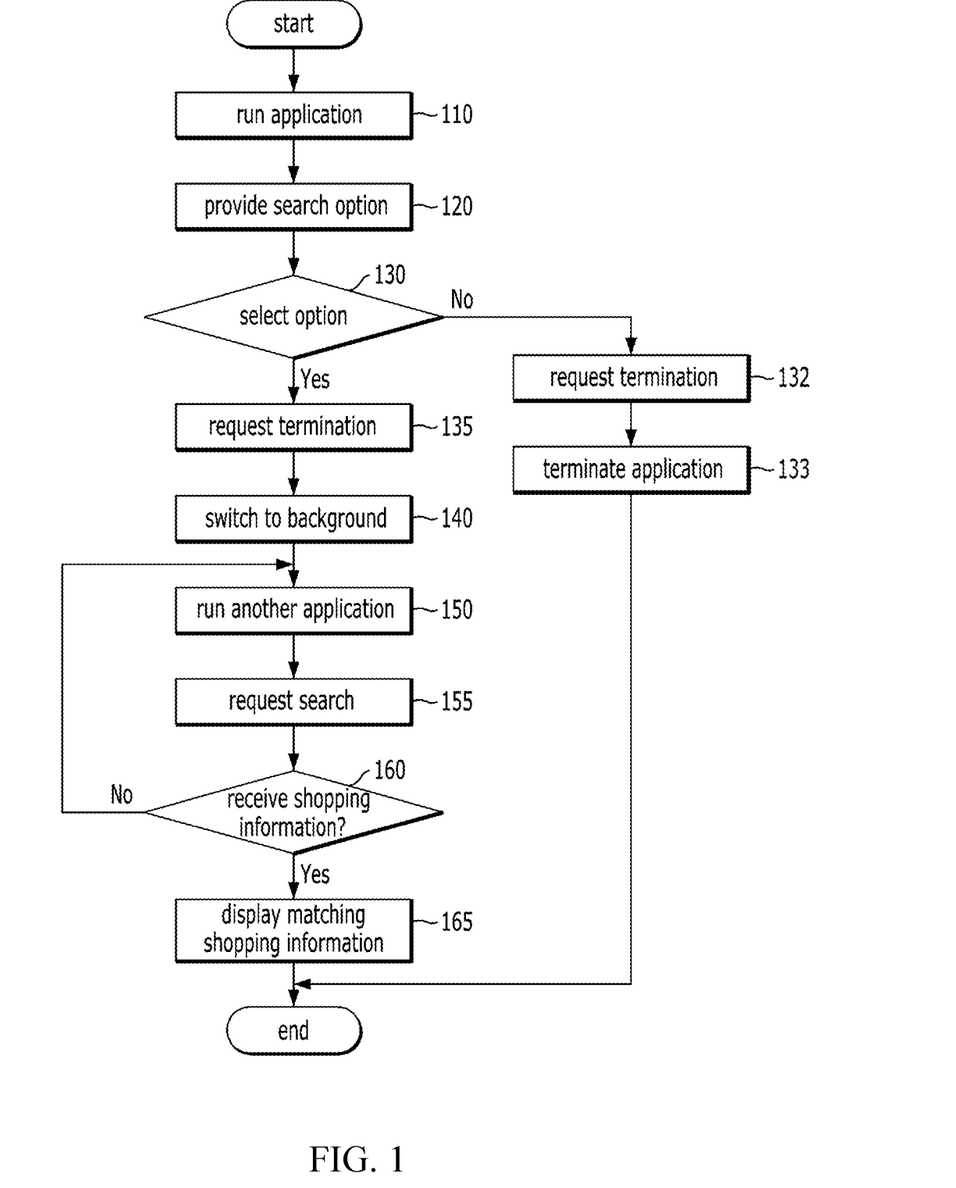
FIG. 1 is a flowchart illustrating an electronic device displaying search information according to an embodiment of the present invention.

FIG. 1 is a flowchart illustrating an electronic device displaying search information according to an embodiment of the present invention.

Although the following description is made assuming that the electronic device is a mobile device, the present invention is not limited thereto. That is, it should be understood that the electronic device according to the present invention includes any type of electronic device that is capable of requesting a product search and displaying search information, for example, a desktop, a smartphone, and a tablet PC.

Although the term 'background' may be used with various meanings in the IT industry, herein the term is to be understood to indicate that an application is running without displaying an execution screen in the present specification. Further, the term 'foreground' may be construed to indicate that an application is running while an execution screen thereof is displayed.

Further, in the present specification, the term 'displayed page in an electronic device' may be understood to indicate a screen loaded on an electronic device to be immediately displayed on the screen by a user's scrolling and/or content in the loaded screen. For example, the page may refer to the entire execution screen of an application that extends lengthwise in the horizontal or vertical direction and is displayed by a user's scrolling on a display of the mobile device, and may also refer to a camera rolling screen.

In operation 110 of FIG. 1, the electronic device may run an information search program according to an embodiment of the present invention. The search program may be an application, a plug-in, an ActiveX control, or an advertising SDK (module or API), which is installed in the mobile device, software installed on a desktop, or an extension program installed in a web browsing tool.

The program may be downloaded and installed by the electronic device from a service server and/or an open application market according to an embodiment of the present invention. Further, the program may be run as an advertising SDK (API or module) mounted in another application.

In operation 110, the electronic device may perform a process for user authentication and security with the installation of the application, and may also perform a procedure for offering user consent for the provision of information to the service server or a separate website server.

In operation 120, the electronic device may offer at least one or more search options through a setting menu of an application execution screen. The search options are for setting up a search mode.

According to the embodiment of the present invention, the search options may include a mode of automatically retrieving a relevant product and/or service without any user search request upon displaying arbitrary content on the electronic device, a mode of receiving a user search request through a search icon only when it is possible to retrieve displayed content, and/or a mode of conducting a product search only upon receipt of an explicit user search request.

In particular, an information search according to the embodiment of the present invention may be conducted without running a search application, opening a separate search page, or receiving additional search term input. That is, according to the present invention, the search may be conducted with specific content being displayed without any separate action for a search. Various search modes according to embodiments of the present invention will be described below with reference to the accompanying drawings.

In operation 130, when an arbitrary search option is selected, the information search application according to the embodiment of the present invention is run in the background to conduct a search. For example, even if an application termination command is received from a user (operation 135), the application according to the embodiment of the present invention may be run in the background, without being completely terminated (operation 140), which is for conducting a search without any separate action for a search, for example, running the search application or displaying a search page.

When no search option is selected in operation 130, which is interpreted to mean that the user does not want an information search using the application (operation 132), the running application is terminated according to the termination command (operation 133).

In operation 150, the electronic device may run various other applications in the foreground while simultaneously running the search application in the background. In this case, the execution screens of the foreground applications may be displayed in a single layer or multiple layers.

In operation 155, the electronic device may conduct an information search for a related product and/or service while displaying arbitrary content. When the electronic device has sufficient resources, the electronic device may directly determine a matching product and/or service. Otherwise, the electronic device may conduct a search by transmitting a query to the service server that conducts an information search.

For example, when a search for a webpage is requested (that is, a search request is received while a web browser is running), the electronic device may transmit URL information on the displayed webpage via a search request query, or may extract text, image, and video data from a URL and transmit the extracted data via the query. Here, when it is impossible to acquire the URL information or to extract the text, image, and video data from the URL, the electronic device may acquire a screenshot of the webpage and may transmit the screenshot via the query.

According to another embodiment of the present invention, when a search request is received while an application other than a web browser is running, the electronic device may acquire a screenshot and/or data that can be uploaded on a relevant page and may transmit the screenshot or data to the service server via a search request query. For example, when a photo viewer application is running, the electronic device may transmit a photo file via the query. In another example, when a video player application is running, the electronic device may transmit a screenshot, taken at a particular time, via the query.

In operation 160, the electronic device may receive matching search information from the service server. For example, the service server may: extract an image, a video, or text included in a query; retrieve a matching product from a database; and offer related shopping information. A specific example in which the service server determines a matching product will be described with reference to the accompanying drawings.

When matching shopping information is received, the electronic device may switch the search application into the foreground to display the matching shopping information (operation 165). The shopping information may include price information on a matching product/service, lowest-price information, an online store offering the lowest price, similar goods, a coupon, and/or promotion information. Further, the shopping information may also include information on other products/services recommended based on a search history log of the user.

For example, when the user browses through a webpage including a flower image, the shopping information may display a flower delivery advertisement list, floral arrangement lesson promotion information, and/or rose festival discount coupon information according to the embodiment of the present invention.

In another example, when the user browses through an SNS including an image of shoes, the shopping image may display other shoes of the same brand as that of the shoes or shopping information on recommended shoes with the same or similar colors and shapes and/or for the same season according to the embodiment of the present invention.

In still another example, when the user browses through a picture including a toy image, the shopping image may display a toy name, a manufacturer, the year of manufacture, lowest-price information, price variation information, an online store, product reviews, user age, and/or usage according to the embodiment of the present invention.

The information may be displayed in text, an image, and/or ActionScript, each of which may be linked to an online store. In addition, the information may be displayed in a separate page or with an icon including a shopping information link around a relevant product on the page that the user is browsing through.

Figure 2:
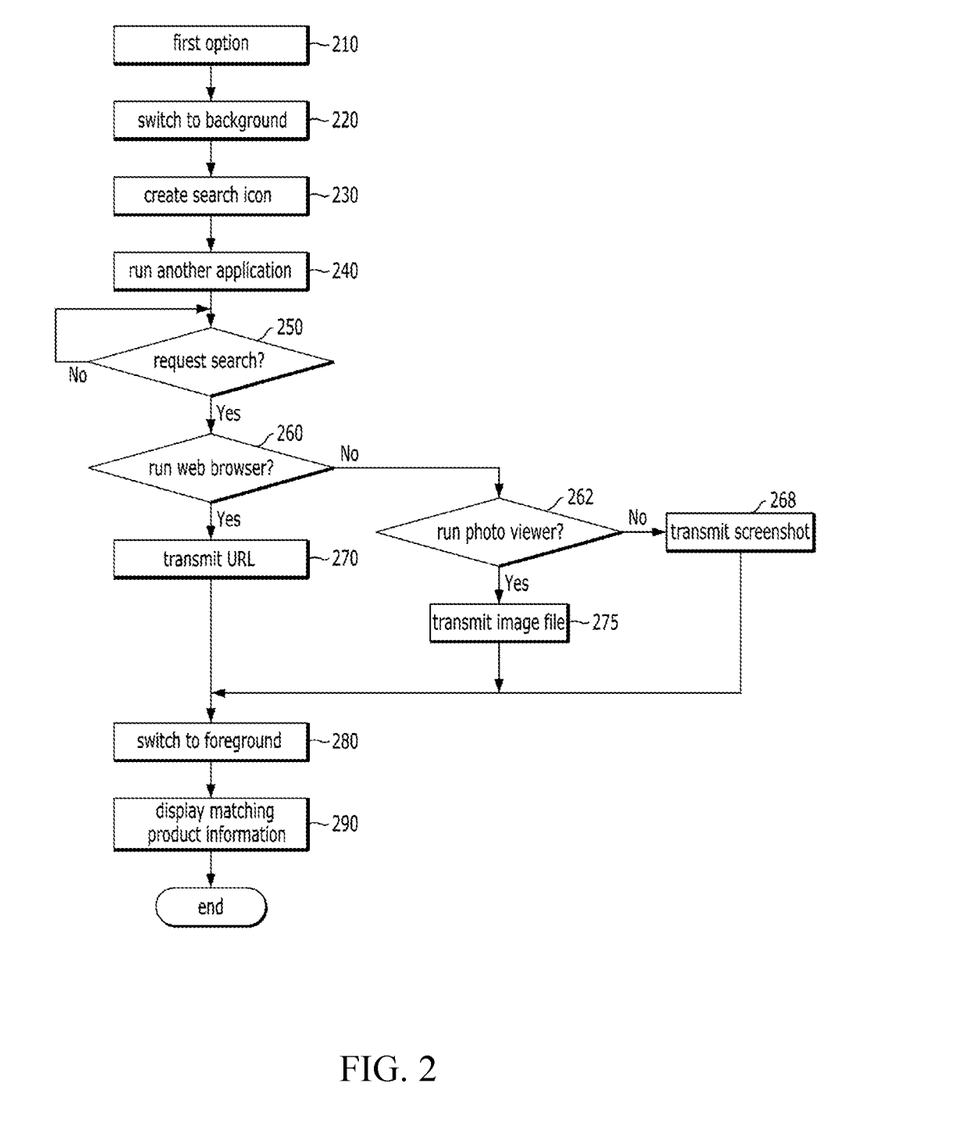
FIG. 2 illustrates a search method according to an embodiment of the present invention.

FIG. 2 illustrates a search method according to an embodiment of the present invention. In describing FIG. 2, details overlapping those of FIG. 1 are omitted or are briefly mentioned.

According to the embodiment of FIG. 2, when there is a search request from a user, a query requesting a search is transmitted. In a mode according to this embodiment, when a search application is run in the background, a search icon is displayed in a notification list and/or a share menu list, and the user browsing through a specific page selects the search icon in the share menu to request a shopping information search for a product included in the page.

Further, according to the embodiment of the present invention, the search icon may be created, but not limited to, not only in the notification list and/or the share menu list but also on a corresponding page in a general case where a user search request is expected to be made.

For example, when a screenshot is created by user request, a user device may create an icon for a search request on a screenshot screen at the same time as creating the screenshot. In addition, when a camera application operates to create an image, the user device may create an icon for requesting a search for an object included in the image on an image viewer screen at the same time as creating the image.

Moreover, the user device may create a search icon only when a preset object is detected from a screenshot or a camera-created image depending on the configuration.

More specifically, when the foregoing mode is set as a search option in operation 210, the application may switch to background execution (operation 220) and the search icon may be created in the notification list, the share menu list, and/or a page for an expected search request (operation 230).

In operation 240, the user may browse through a plurality of pages, content, and/or an application while running the application of the electronic device.

When the user wants to perform a related shopping information search while browsing through a specific page, the user may open a notification window to select the search icon included in the notification list or may open a share menu to select the search icon included in the share list in operation 250. According to the embodiment of the present invention, the notification window or share menu including the search icon may be open according to a conventional technology, which serves to improve the intuitiveness of a product search by using a user-friendly user interface (UI).

According to another embodiment of the present invention, when the user creates a screenshot, a search icon may be displayed at the same time as the screenshot is created. When the user creates an image using a camera application, a search icon may be displayed on an image viewer screen. A specific UI for displaying the search icon will be described with reference to the accompanying drawings.

When the application running in the foreground is a web browser (operation 260), the electronic device may transmit a query including a history log of the web browser to a service server (operation 270). The history log may include a browsing execution history of the web browser. Particularly, the electronic device may transmit URL information on the most recently visited webpage, that is, URL information on the webpage browsed by the user right before selecting the search icon, via the query.

In operation 270, the electronic device may extract image, video, or text data included in the URL of the webpage and may transmit the extracted data via the query. Further, when it is impossible to extract the URL and the image, video, or text data, the electronic device may extract a screenshot and may transmit the screenshot via the query.

According to another embodiment of the present invention, when the application running in the foreground is a photo viewer (operation 262), the electronic device may transmit a query including an image file displayed by the photo viewer (operation 275). Alternatively, the electronic device may extract a screenshot of the foreground application and may transmit the screenshot via a query (operation 268).

For example, when the user shopping in a hypermarket is curious about the lowest online price of a telephone being displayed, the user may take a picture of the telephone using a camera application of the electronic device and may open the notification window to select a product search icon, with the picture displayed. In this case, the electronic device may transmit a telephone picture file to the service server via a query.

Subsequently, when shopping information on a matching object is received from the service server in response to the query, the electronic device may switch the shopping information search application to run in the foreground in operation 280 and may display shopping information in operation 290.

Figure 3A:
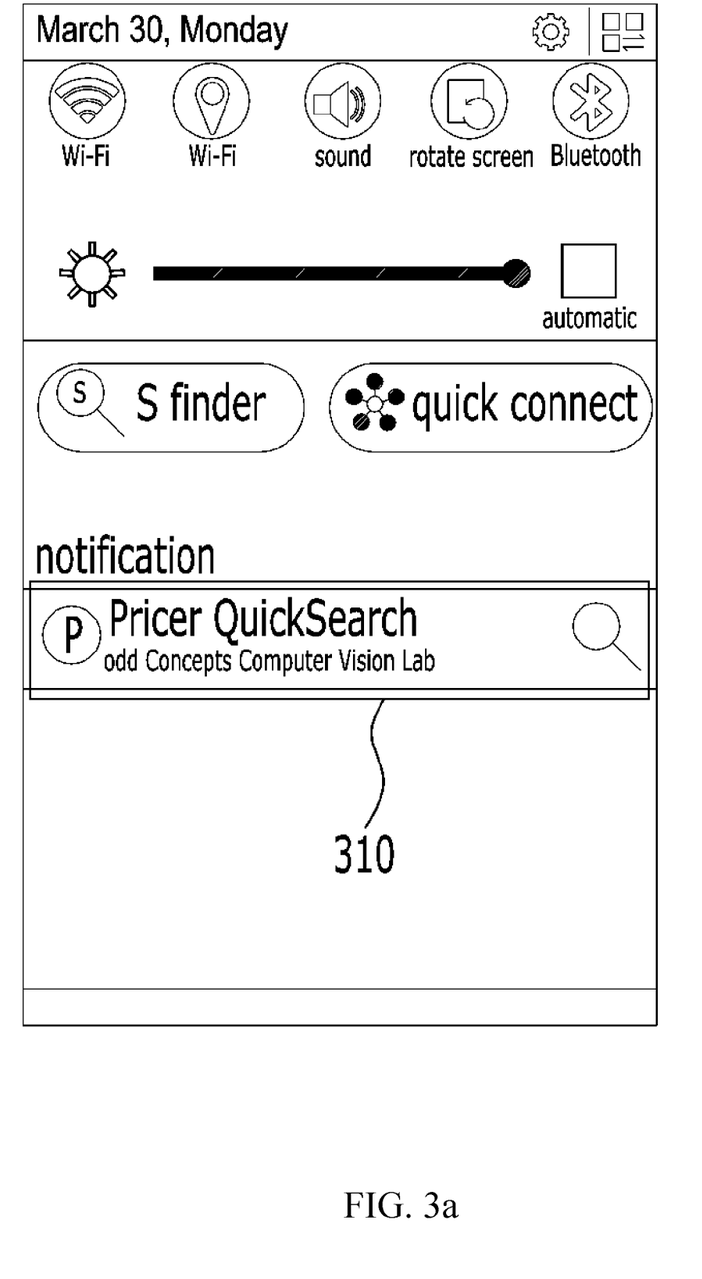
FIGS. 3a and 3b illustrate an example of a user interface displaying a search icon according to an embodiment of the present invention.
Figure 3B:
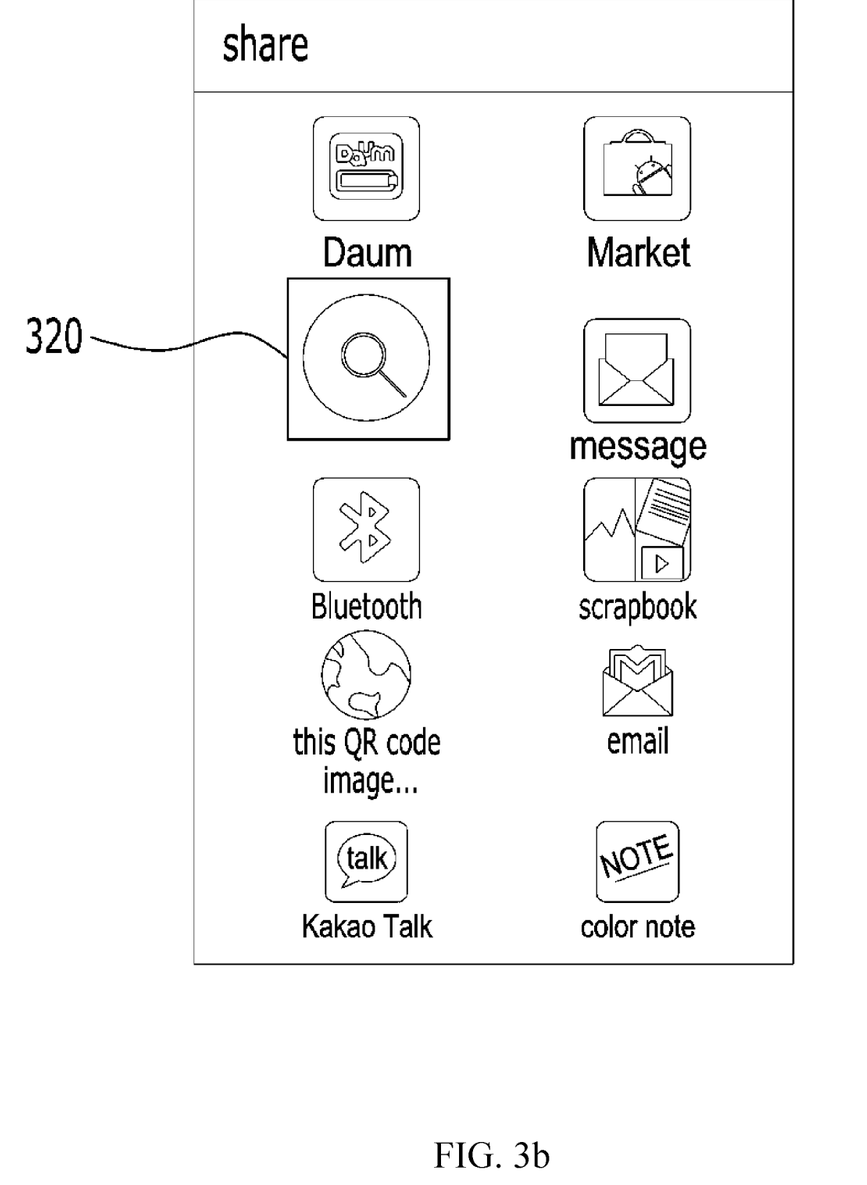

FIGS. 3a and 3b illustrate an example of a user interface displaying a search icon according to an embodiment of the present invention.

FIG. 3a illustrates a search icon 310 displayed in a notification list of a notification window according to an embodiment of the present invention.

For example, while browsing through a page, the user may perform a drag starting from the top edge of a display to open the notification window illustrated in FIG. 3a, and may select the search icon 310 displayed in the notification list to request a search on the browsing page.

FIG. 3b illustrates a search icon 320 displayed in a share list according to an embodiment of the present invention.

For example, while browsing through a page, the user may select a share menu to open the share list illustrated in FIG. 3b and may select the search icon displayed in the share list to request a search on the browsing page.

Figure 4:
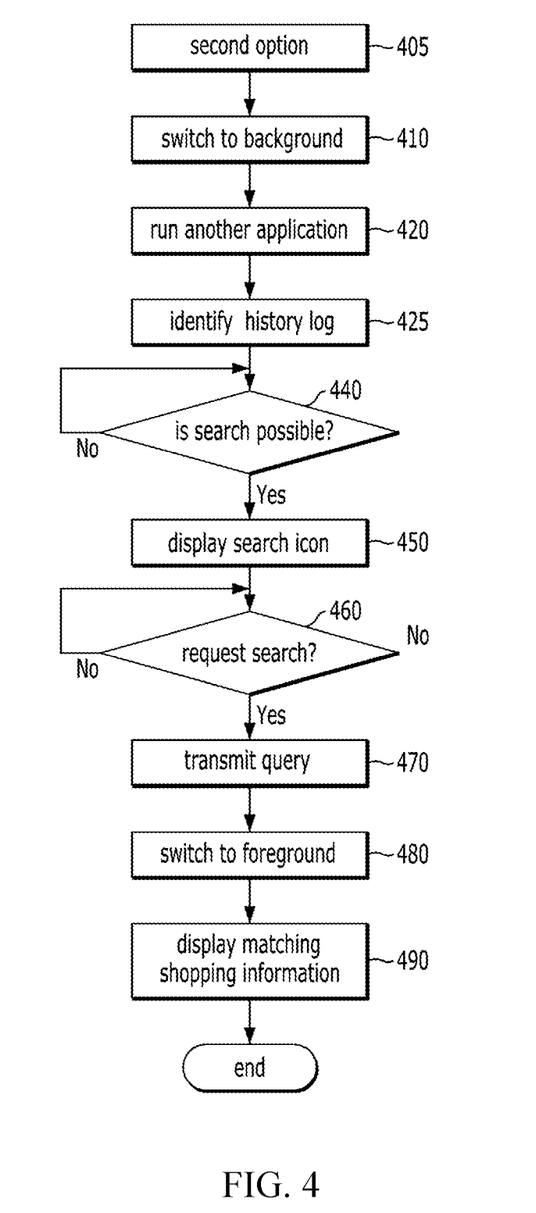
FIG. 4 illustrates a search method according to another embodiment of the present invention.

FIG. 4 illustrates a search method according to another embodiment of the present invention. In describing FIG. 4, details overlapping those of FIG. 2 are omitted or are briefly mentioned.

In FIG. 4, the electronic device may first determine whether it is possible to retrieve a specific page, and may display a search icon only when possible. According to the embodiment, when a product search is possible, the electronic device notifies the user that the product search is possible using a search icon, and transmits a query only when the user selects the icon, thus reducing the amount of resources required to transmit and process the query.

When the foregoing mode is set as a search option (operation 405), a search application may switch to background execution (operation 410), and the user may browse through a plurality of pages while running other applications in operation 420.

According to the embodiment of the present invention, the search icon is displayed only when it is possible to retrieve the page (operations 440 and 450). For example, the electronic device may determine whether it is possible to retrieve content included in a displayed page using the number of images included in the page, the size of each image, the form of each image, whether it is possible to extract text or an image from the page, and/or the URL type or address of the page, and may display the search icon on the page only when possible.

A description on a user interface displaying a search icon will be made below in detail with reference to the accompanying drawings.

When the user selects the displayed search icon, a query about the page may be transmitted (operations 460 and 470). When matching shopping information is received in response to the query, the product search application may switch to foreground execution and the received matching shopping information may be displayed (operations 480 and 490). Operations 470 to 490 are substantially the same as operations 260 to 290 described above in FIG. 2 and thus are briefly mentioned.

In the embodiment, a procedure for identifying whether it is possible to retrieve a product included in the page is essential. To reduce the amount of resources required for the procedure, the electronic device may periodically identify whether the web browser is running, may periodically identify the history log of the web browser when the web browser is running, and may identify whether it is possible to retrieve the product only when the web browser is updated (operation 425).

More specifically, the search application according to the embodiment of the present invention may periodically identify whether the web browser is running in the background, and may periodically identify the history log of the web browser when the web browser is running. In this manner, the search application may identify the possibility of a search only when the web browser is updated, instead of identifying the possibility of a search with respect to all webpages.

Figure 5A:
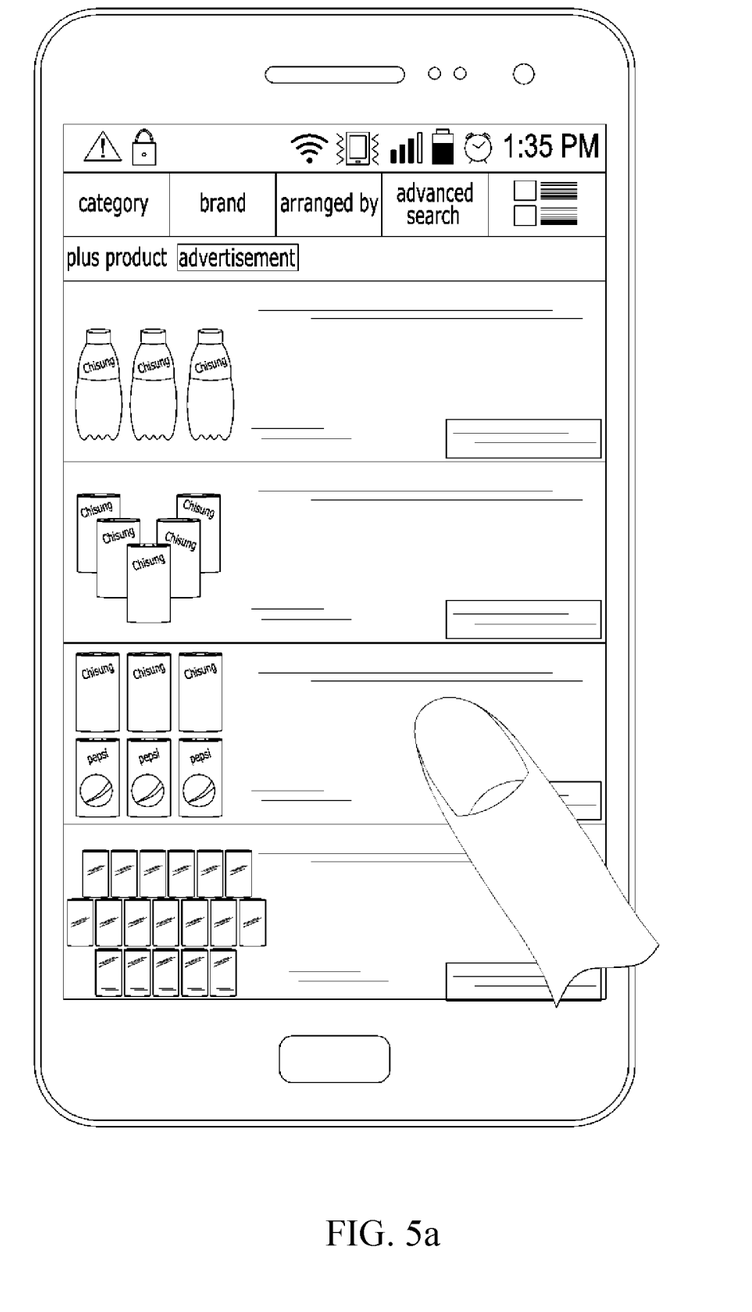
FIGS. 5a and 5b illustrate an example of a user interface displaying a search icon according to another embodiment of the present invention.
Figure 5B:
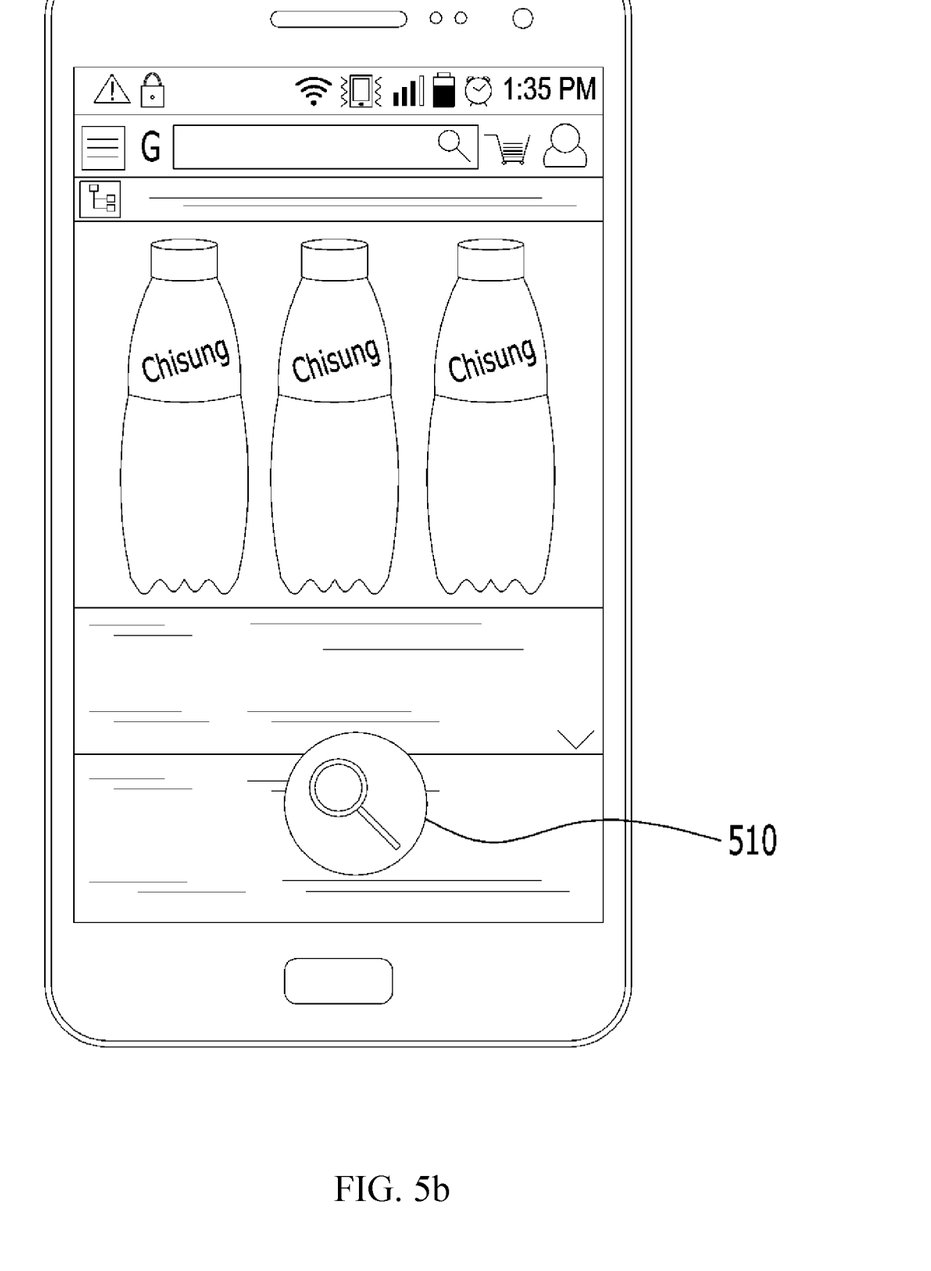

FIGS. 5a and 5b illustrate an example of a user interface displaying a search icon according to the search mode illustrated in FIG. 4.

As illustrated in FIG. 5a, according to the embodiment of the present invention, even though a page displays a plurality of products, when the page does not have a format suitable for a product search, no search icon is displayed.

However, when the user selects a specific object in FIG. 5a and thus a product specification page is displayed, as in FIG. 5b, if the page has a format suitable for a search, the search icon 510 may be displayed.

According to this mode, when the search icon is displayed on a page that the user is browsing through, the user may recognize that it is possible to retrieve a corresponding product. Further, shopping information is immediately displayed upon selecting the search icon, and thus the icon may be considered to be a link for visiting a shopping information page.

Figure 6:
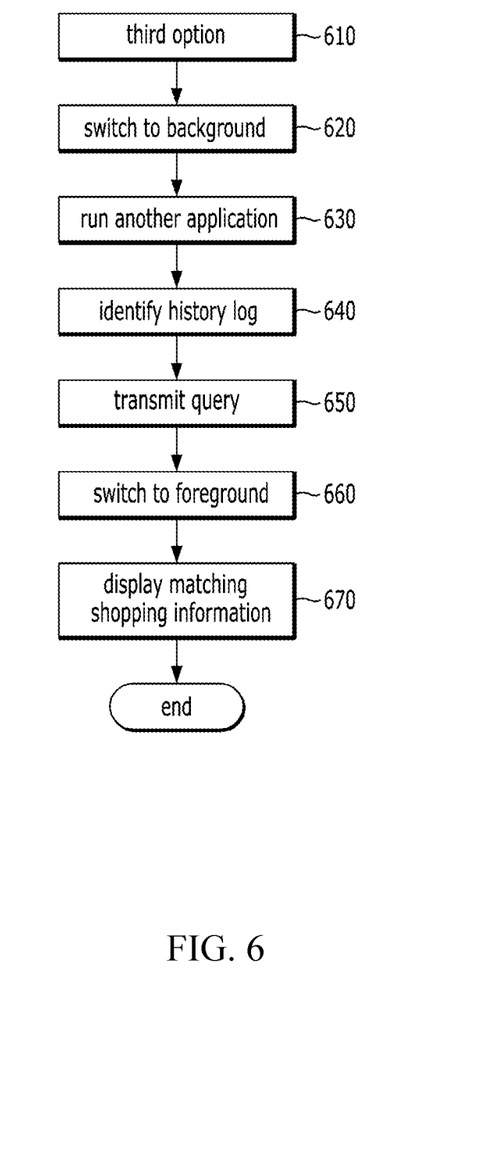
FIG. 6 illustrates a search method according to still another embodiment of the present invention.

FIG. 6 illustrates a search method according to another embodiment of the present invention. In describing FIG. 6, details overlapping those of FIG. 2 to FIG. 4 are omitted or are briefly mentioned.

According to the search method of FIG. 6, a query for a shopping information search on a displayed page may be automatically transmitted without any type of user input for requesting a search.

When the foregoing mode is set as a search option (operation 610), a search application may switch to background execution (operation 620), and the user may browse through a plurality of pages while running other applications in operation 630.

For example, when the application running in the foreground is a web browser, a URL of a webpage may be transmitted via the query (operation 650), and a service server may determine a matching product and/or service using data offered through the URL.

Here, when the service server offers shopping information, the search application may switch to foreground execution in operation 660 and the shopping information may be displayed in operation 670. Here, even though the shopping information is received from the service server, the shopping information may be set to be displayed only when the users wants to display the shopping information. Operations 650 to 670 are substantially the same as operations 260 to 290, described above with reference to FIG. 2, and thus are briefly mentioned.

In the embodiment, since the query is automatically transmitted, the electronic device may be set to transmit the query only when the web browser is updated.

More specifically, the search application according to the embodiment of the present invention may periodically identify whether the web browser is running in the background, and may periodically identify the history log of the web browser when the web browser is running (operation 640).

In this manner, the search application may transmit the query only when the web browser is updated, instead of identifying the possibility of a search with respect to all webpages (operation 650). Further, when matching shopping information is received in response to the query and is displayed (operation 670), if the history log of the browser is changed or the screen moves to the previous page from the webpage transmitting the query, the display of the matching shopping information may be stopped.

Figure 7:
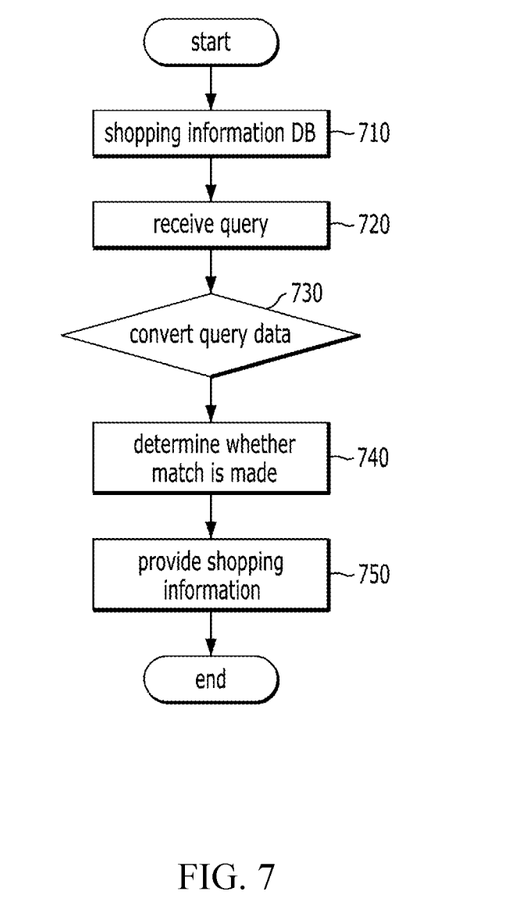
FIG. 7 illustrates a service server offering search information according to an embodiment of the present invention.

FIG. 7 illustrates a service server offering search information according to an embodiment of the present invention.

In operation 710, a shopping information provision server may create a shopping information database. The shopping information may include a product name, product images of different sizes from different angles, the usage of a product, product reviews, manufacturer information, store information, price information, advertising information, coupon information, and/or promotion information, and may also include a link to similar goods and recommended products based on a user history log. Methods for collecting the shopping information from different routes and for designing and storing the database may follow conventional techniques.

Further, the service server may generate feature information on product images stored in the database to create a database. For example, the service server may extract a point of interest of a product image, may calculate a feature descriptor, and may index feature information on images to at least one or more categories for efficiency of retrieval.

The service server may receive a query from an electronic device in operation 720, and may convert data included in the query in operation 730.

For example, when the query includes URL information, the service server may extract image, video, and/or text data offered by the URL and may select only data on a product.

Further, when the query includes image data, the service server may extract a unique value (hash information, header information, or the like) of an image from a query image and/or may extract feature information on the image to process the unique value or the feature information so as to have a form appropriate for an image search. For example, the service server may convert a feature descriptor for the query image based on the same criteria as for indexing a feature descriptor for a database image, which enables a subsequent search process to be performed quickly and efficiently.

In operation 740, the service server may determine whether the query data matches a product and/or service included in the database.

For example, the service server may retrieve a set of feature descriptors for the database image in order to determine whether the distance between a feature descriptor vector value of the database image and a feature descriptor vector value of the query image is within a preset threshold. Further, the service server may determine the degree of consistency (geometric consistency) between the query image and the database image using attributes of the feature information, such as positional information, scale, rotation degree, and distribution information on the point of interest or feature descriptor for the image, and may determine whether the degree of consistency is higher than a preset threshold and thus retrieve a matching product and/or service. In operation 750, the service server may offer shopping information on a matching product/service.

The embodiments of the present invention disclosed in this specification and the drawings show specific examples only to easily explain technical contents of the present invention and to help comprehension of the present invention, and are not intended to limit the scope of the present invention. It will be obvious to those skilled in the art to which the present invention pertains that other modified embodiments on the basis of the spirits of the present invention besides the embodiments disclosed herein may be carried out.

The invention claimed is:

1. A method for displaying search information by an electronic device, the method comprising:
   providing a plurality of search options indicative of a respective search mode of a search application;
   running the search application in a background state in response to one of the plurality of search options being selected;
   transmitting a query about a displayed page responsive to selection of the one of the plurality of search options by a user; and
   displaying search information matching retrievable content comprised in the displayed page in response to receiving the search information, wherein the search information is received responsive to the query,
   wherein transmitting the query comprises:
   displaying a search icon while displaying the displayed page when the search application runs in the background state and when it is possible to retrieve the retrievable content comprised in the page;
   periodically identifying, with the search application, whether a web browser running the displayed page is running and periodically identifying, with the search application, whether a history log of the web browser running the displayed page has been updated when the web browser is running; and transmitting the query about the retrievable content comprised in the displayed page comprising at least one of an updated history log of the web browser running the displayed page when the history log is updated and data extracted from the updated history log when the history log is updated and at least one of data that is extracted from the displayed page and is uploadable and a screenshot of the displayed page, responsive to receiving an input to select the search icon, and wherein displaying the search information comprises:
switching the search application from the background state into a foreground state upon receiving the search information to thereby display the search information on a screen.

2. The method as claimed in claim 1, wherein the displaying of the search icon comprises determining whether it is possible to query the page using one or more of a number of images comprised in the page, a size of each of the images, a form of each of the images, whether it is possible to extract text or an image from the page, and a URL type or an address of the page.

3. A method for displaying search information by an electronic device, the method comprising:
providing a plurality of search options indicative of a respective search mode of a search application;
running the search application in a background state in response to one of the plurality of search options being selected;
displaying a search icon while displaying an arbitrary page when the search application runs in the background state and when it is possible to retrieve content comprised in the arbitrary page;
periodically identifying, with the search application, whether a web browser running the arbitrary page is running and periodically identifying, with the search application, whether a history log of the web browser running the arbitrary page has been updated when the web browser is running;
transmitting a query about the content comprised in the arbitrary page responsive to receiving input to select the search icon from a user, wherein, when the history log of the web browser running the arbitrary page has been updated, the query comprises at least one of an updated history log of the web browser running the arbitrary page and data extracted from the updated history log; and
switching the search application from the background state into a foreground state upon receiving the search information, wherein the search information is responsive to the query, to thereby display the search information on a screen.

4. A non-transitory computer-readable storage medium storing an application that performs processing to display search information in an electronic device, the application performing:
providing a plurality of search options indicative of a respective search mode of a search application;
running the search application in a background state in response to one of the plurality of search options being selected;
transmitting a query about a displayed page responsive to selection of the one of the plurality of search options by a user; and displaying search information matching retrievable content comprised in the displayed page,
wherein transmitting the query comprises:
displaying a search icon while displaying the displayed page in response to receiving the search information, wherein the search information is received responsive to the query, when the search application runs in the background state and when it is possible to retrieve the retrievable content comprised in the page;
periodically identifying whether a web browser running the displayed page is running and periodically identifying whether a history log of the web browser running the displayed page has been updated when the web browser is running; and
transmitting the query about the retrievable content comprised in the displayed page comprising at least one of an updated history log of the web browser running the displayed page when the history log is updated and data extracted from the updated history log when the history log is updated and at least one of data that is extracted from the displayed page and is uploadable and a screenshot of the displayed page, responsive to receiving an input to select the search icon, and
wherein displaying the search information comprises:
switching the search application from the background state into a foreground state upon receiving the search information to thereby display the search information on a screen.

5. An electronic device for displaying search information, the electronic device comprising:
a display configured to display an arbitrary page; and
a controller configured to transmit a query about the arbitrary page to a shopping information provision server and to control display of search information matching the arbitrary page,
wherein the controller performs control to:
provide a plurality of search options indicative of a respective search mode of a search application;
run the search application in a background state in response to one of the plurality of search options being selected;
display a search icon while displaying the arbitrary page when the search application runs in the background state and when it is possible to retrieve content comprised in the arbitrary page;
periodically identify whether a web browser running the arbitrary page is running and periodically identify whether a history log of the web browser running the arbitrary page has been updated when the web browser is running;
transmit the query about the content comprised in the arbitrary page responsive to receiving an input to select the search icon, wherein, when the history log of the web browser running the arbitrary page has been updated, the query comprises at least one of an updated history log of the web browser running the arbitrary page and data extracted from the updated history log; and
switch the search application from the background state into a foreground state in response to receiving the search information receiving the search information, wherein the search information is received responsive to the query, to thereby display the search information on a screen.

6. The method as claimed in claim 1, wherein the search icon is displayed in a notification window or a share list.

7. The method as claimed in claim 1, wherein the query about the content is transmitted to a service server in response to a user input to select the search icon when the search application runs in the background state.

8. The method as claimed in claim 1, wherein, when one of the plurality of search options is selected, displaying the search icon comprises displaying the search icon in a notification window in response to a drag from a top edge of the screen to open the notification window.

9. The method as claimed in claim 1, wherein, when one of the plurality of search options is selected, displaying the search icon comprises displaying the search icon in a share list in response to selecting a share menu to open the share list.

* * * * *